United States Patent
Yamasaki et al.

[11] Patent Number: 5,909,175
[45] Date of Patent: Jun. 1, 1999

[54] CONNECTION SWITCHING CIRCUIT FOR RING SYSTEM

[75] Inventors: Shosaku Yamasaki, Osaka; Atsuki Taniguchi; Kazuo Takatsu, both of Kawasaki, all of Japan

[73] Assignee: Fujitsu Limited, Kanagawa, Japan

[21] Appl. No.: 08/988,786

[22] Filed: Dec. 11, 1997

[30] Foreign Application Priority Data

Feb. 28, 1997 [JP] Japan ................................. 9-046511

[51] Int. Cl.⁶ ............................. G08B 29/00; H04J 3/00
[52] U.S. Cl. .................. 340/506; 340/825.05; 370/222; 370/223; 370/224; 370/258
[58] Field of Search ............................. 340/506, 825.05; 370/222, 223, 224, 258, 244, 248

[56] References Cited

U.S. PATENT DOCUMENTS

| | | | |
|---|---|---|---|
| 4,716,561 | 12/1987 | Angell et al. | 370/538 |
| 5,394,389 | 2/1995 | Kremer | 370/223 |
| 5,406,401 | 4/1995 | Kremer | 359/110 |
| 5,406,549 | 4/1995 | Kremer | 370/224 |
| 5,440,540 | 8/1995 | Kremer | 370/223 |
| 5,442,620 | 8/1995 | Kremer | 370/224 |
| 5,491,686 | 2/1996 | Sato | 370/223 |

*Primary Examiner*—Donnie L. Crosland
*Attorney, Agent, or Firm*—Helfgott & Karas, PC

[57] ABSTRACT

A connection switching circuit is disposed in each node of a ring system in which a first ring and a second ring are provided with two communication lines which allow data to flow in a different direction respectively and is connected with a currently used passage and preliminary passage. The connection switching circuit comprises an alarm correction reading part for generating a control signal, an alarm monitor part for outputting respective alarm detection signals, a currently used/and preliminary alarm recognition part, and a switching control signal generation part for generating a control signal for selecting a passage, wherein either the currently used passage or the preliminary passage is selected by monitoring the alarm of the data which flows on the currently used passage or the preliminary passage to connect the first ring and the second ring with each other.

7 Claims, 9 Drawing Sheets

CONNECTION SWITCHING CIRCUIT FOR RING SYSTEM

CROSS-REFERENCES TO RELATED APPLICATIONS

This Patent application is related to Japanese Patent Application No. Hei 9(1997)-046511, filed on Feb. 28, 1997 whose priority is claimed under 35 USC Section 119, the disclosure of which is incorporated by reference in its entirety.

BACKGROUND OF THE INVENTION

1. Field of the Invention

The present invention relates to a connection switching circuit for ring system, and more particularly to a connection switching circuit which can be used in a ring system, especially a BLSR (Bi-directional Line Switched Ring) system or the like for optical communication network by means of SDH (Synchronized Digital Hierarchy).

2. Description of the Related Art

Conventionally, a number of ring type optical communication networks are used as a large scale network.

Then various designs are made for mutually connecting the ring type communication networks. For example, the following UPSR (Uni-directional Path Switched Ring) system is conventionally used.

Figure 9:
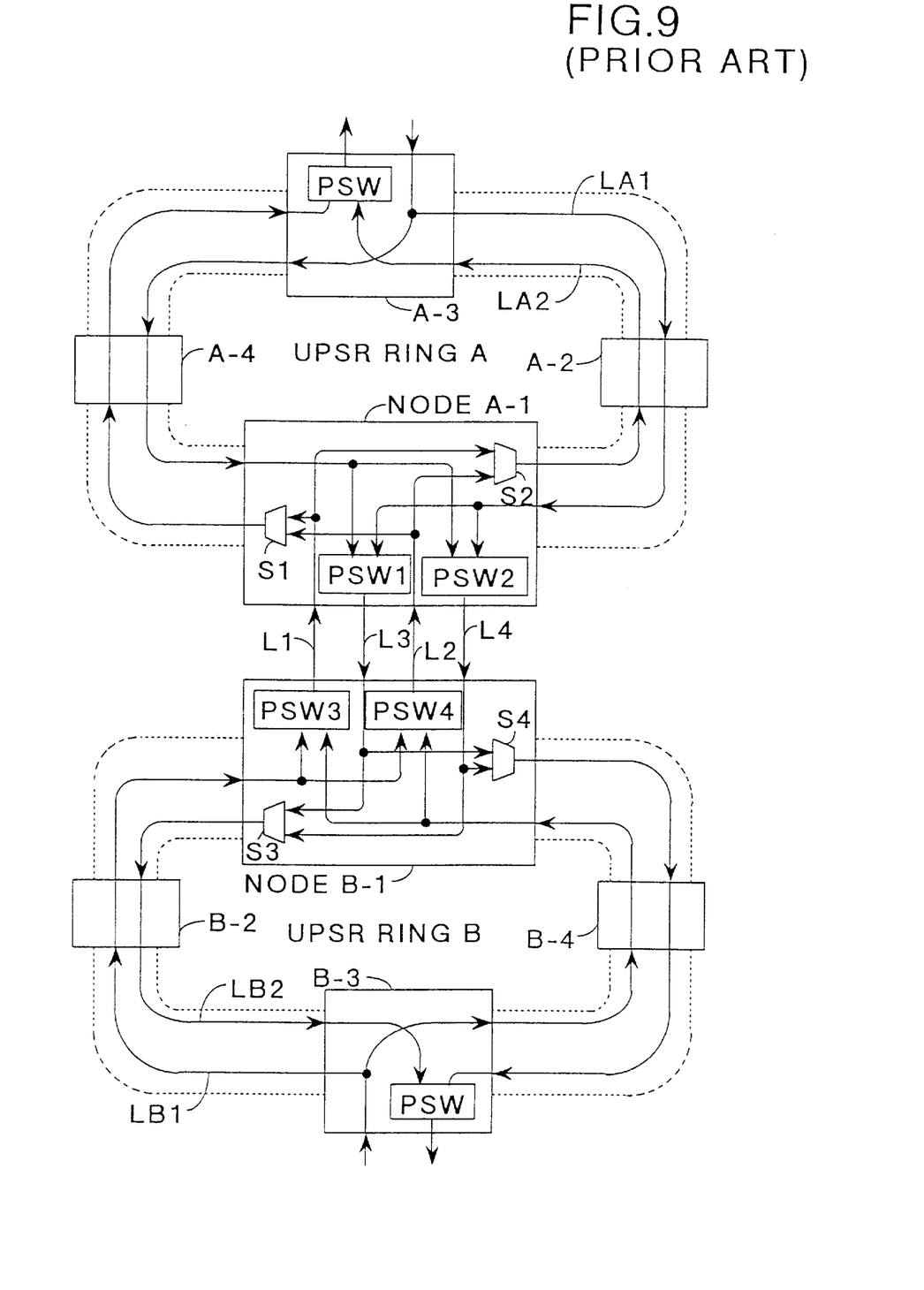
FIG. 9 is a view for explaining an operation of the conventional ring system.

FIG. 9 is a view for explaining a schematic structure of a conventional UPSR system. In FIG. 9, the ring system comprises two UPRS rings A and B. The ring system is constituted in such a manner that two UPSR rings A and B are mutually connected by a node A-1 on the UPSR ring A and a node B-1 on the UPSR ring B.

Furthermore, each of the UPSR rings A and B comprises lines (LA1 and LB1) which allows data to flow in a clockwise direction and lines (LA2 and LB2) which allows data to flow in an anti-clockwise direction. On each of the UPSR ring, a plurality of nodes (A-1, A-2, B-1, B-2 and the like) are arranged.

On nodes A-1 and B-1 for mutually connecting rings, a PSW (Path Switch) is provided and the rings are mutually connected by appropriately changing two lines depending on the situation of the line quality. And, other nodes which do not have relation to the mutual connection directly also include a PSW.

In the conventional UPSR system, for securing reliability, data is allowed to flow through clockwise lines (LA1 and LB1) and anti-clockwise lines (LA2 and LB2) at all times.

Now, a case is considered in which communication is carried out between node A-3 on the UPSR ring A and node B-3 on the UPSR ring B.

In the beginning, data which is transmitted from the node A-3 is transmitted to the clockwise and anti-clockwise lines (LA1 and LA2) of the UPSR ring A to be input to the node A-1.

Either of the two same data which is input to the node A-1 is selected in PSW1 and PSW2 to be output to the node B-1 on the UPSR ring B. Here, the fact that two PSW, i.e. PSW 1 and PSW 2 are provided in one node A-1 is to connect two rings (A, B) with two circuits L3 and L4 with respect to the data transmission from the UPSR ring A to the UPSR ring B.

In other words, data which is selected with PSW1 is output to node B-1 through line L3, and data selected with PSW2 is output to node B-1 through L4.

Next, data input from the lines L3 and L4 is given to the selection parts S3 and S4 where either the data from the line L3 or the data from the line L4 is selected.

Then, the data selected at each of the selection parts S3 and S4 is output to the clockwise line (LB1) or the anticlockwise line (LB2) so that both data is transmitted to node B-3. At node B-3, either of the data is adopted at the inside PSW.

At each PSW, the line quality is inspected at all times on the basis of the predetermined standard. Out of the two data which is to be input, data which is not provided with an alarm is selected. On the contrary, a similar operation is carried out with respect to the case in which data is transmitted from node B-3 to node A-3.

In the aforementioned UPSR ring system, the reliability of the data transmission is sufficiently secured in order to allow the same data to flow through the two lines A1 and LA2. However, the use efficiency of the line is poor. Besides, in the case where a trouble is caused to one of the line, data on the other line is selected to secure the transmission, but at this time, the line where the trouble is caused is not used.

SUMMARY OF THE INVENTION

The present invention provides a connection switching circuit to be used for a ring system in which a first ring including a first node and a second node, and a second ring including a third node and a fourth node are provided with two communication lines which allow data to flow in a different direction respectively, and the system is connected with a currently used passage connecting the first node and the third node and a preliminary passage connecting the second node and the fourth node, the circuit being disposed in said each node, and comprising:

an alarm correction reading part for generating a control signal for making a detour at a communication line within the same ring by using an alarm of the data which flows in the two communication line when troubles of lines within the same ring generate;

an alarm monitor part for outputting respective alarm detection signals by detecting an alarm which is generated in the currently used passage and the preliminary passage;

a currently used/and preliminary alarm recognition part for identifying whether the detected alarm is generated on the currently used passage and for outputting an identify signal by using the alarm detection signal;

a switching control signal generation part for generating a control signal for selecting a passage to be used in the data transmission between the rings by using the identify signal, either the currently used passage or the preliminary passage being selected by monitoring the alarm of the data which flows on the currently used passage or the preliminary passage to connect the first ring and the second ring with each other.

DESCRIPTION OF THE PREFERRED EMBODIMENTS

The present invention provides a connection switching circuit of a ring system provided with the aforementioned structure which circuit enables a more efficient use of line in case of connecting mutually between plural rings.

Furthermore, the present invention provides a BLSR type ring system wherein the aforementioned connection switching circuit is provided on each node on plurality of rings which constitute a SDH interface network and rings are connected with each other with the connection switching circuit.

A concatenation control part may be further provided which converts a control signal which is generated at the aforementioned switching control signal generating part so that a plurality of data to be concatenated which flows between the first and the second rings is data which is transmitted from either of the currently used passage or the preliminary passage.

Irrespective of the presence of the generation of an actual alarm of the currently used passage and the preliminary passage, a test control part which makes a generation state of the alarm forcibly and gives a suspected identification signal to the aforementioned switching control signal generation part may be further provided.

Furthermore, the aforementioned switching control signal generation part may provide a returning part for returning to the currently used passage on the basis of the forcible return control signal which is given from the outside.

The aforementioned alarm monitor part may provide a rewritable memory circuit which memorizes information indicative of the continuation time of the alarm.

The present invention will be described in detail on the basis of the embodiment shown in the drawings. Incidentally, the present invention is not limited thereto.

Figure 1:
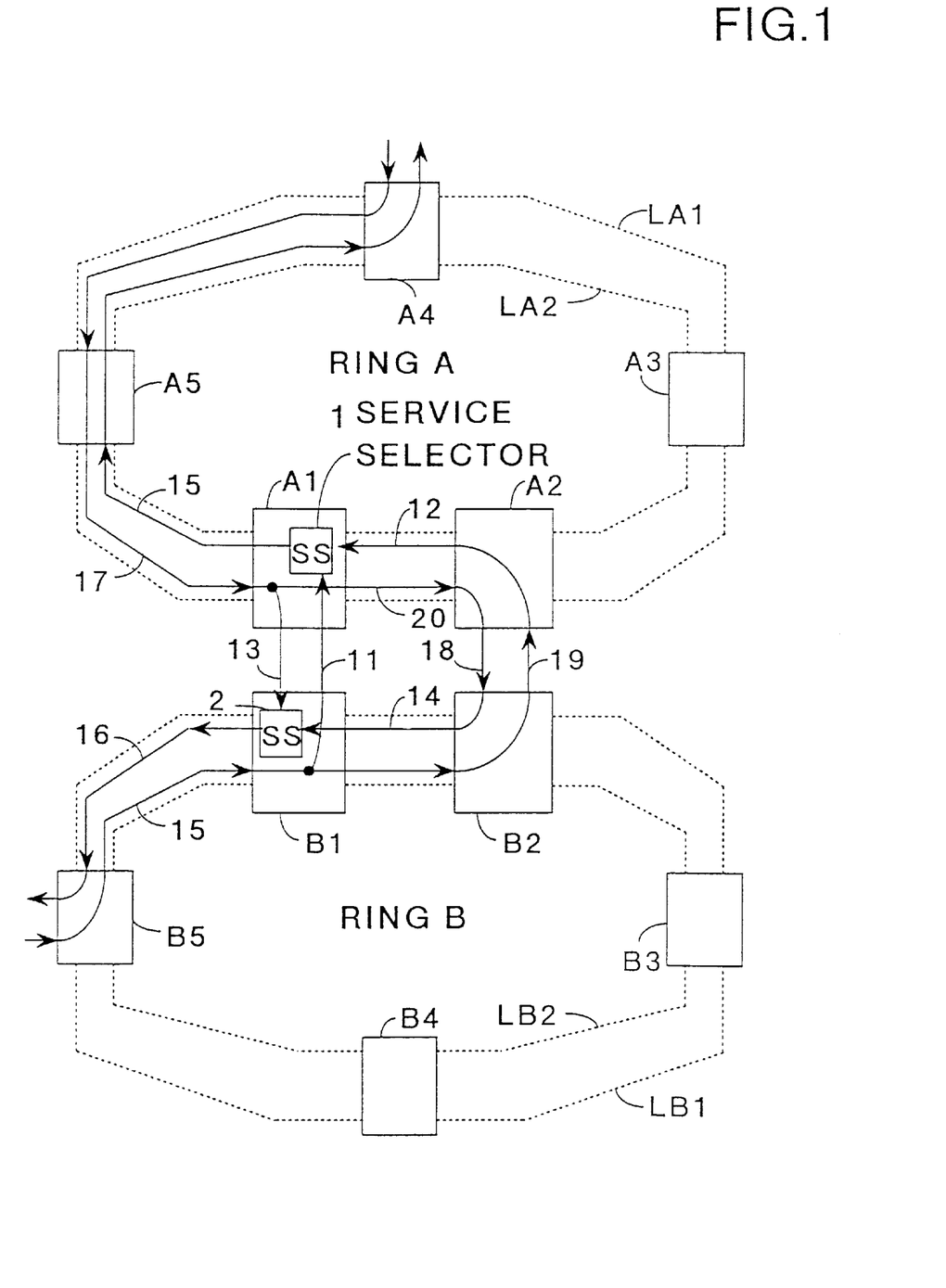
FIG. 1 is a schematic view showing a ring system according to one embodiment of the present invention.

FIG. 1 is a view showing a schematic structure of a ring system according to one embodiment of the present invention.

In this embodiment, the two rings A and B are mutually connected with nodes A1, A2, B1 and B2. Furthermore, there will be explained hereinbelow one embodiment in which the present invention is applied to the BLSR system. However, the present invention is not limited thereto. The invention can be applied to other systems for carrying out a connection between rings.

Generally one ring comprises two ring lines. However, in the UPSR system, the same data is transmitted to two ring circuits having different directions. For example, right-rotating ring line is used as a currently used line while the left-rotating line is used as a preliminary line.

On the other hand, in the BLSR ring system, data is transmitted only to the ring line which is used as the currently used line. For example, with respect to the data in which the right-rotating ring line is used as the currently used line, the left-rotating line is used as the preliminary line. On the other hand, with respect to the data in which the left-rotating line is used as the currently used line, the right-rotating line is used as the preliminary line.

In the BLSR ring system, either of the two ring lines (for example, LA1 in FIG. 1) is used as the currently used line in order to allow one data to flow. The other ring line (LA2) is used as a communication line between other nodes.

In FIG. 1, the node A1 and the node B1 are connected with the passage 11 and the passage 13 while the node A2 and the node B2 are connected with the passage 18 and the passage 19.

Each of the rings comprises two ring lines (LA1 and LA2) and (LB1 and LB2). In addition, on the nodes A1, A2, B1 and B2 which are associated with the ring mutual connection, a service selector part (SS) is provided which serves as a role of the connection switching circuit.

The service selector part 1 shown in FIG. 1 is provided on the node A1. Then either of the two data given from the passage 11 and the passage 12 is selected in the channel unit to carry out an operation for sending data to the passage 15. In the similar manner, the service selector part 2 provided on the node B1 selects either of the two data given from the passage 13 and the passage 14 in the channel unit to carry out an operation of sending data to the passage 16. One data comprises a plurality of channels and it happens that the passage selected for each channel is different.

For example, data which is transmitted through the passage 17 is branched off in the node so that the same data is sent to the passage 13 and the passage 18 to be given to the service selector part 2 of the node B1.

In the service selector part 2, either the data which has passed through the passage 13 or the data which has passed through the passage 18 is selected to be sent to the passage 16.

Furthermore, the service selector parts 1 and 2 are provided with a function of constantly monitoring the data given from the two passages (passages 11 and 12 or the passages 13 and 14) to check the respective line quality thereof. Then, the service selector part selects data given from the passage which has better line quality. The quality of the line is judged with the alarm information which will be described later.

In this manner, the same data is transmitted via the passage 13 and passage 18 with the result that even when the trouble is caused in the passage 18, for example, the transmission of data between rings is saved by the passage 13. On the contrary, even when the trouble is caused in the passage 11 and the passage 13, the transmission of data is saved by the passage 18 and 19.

Figure 2:
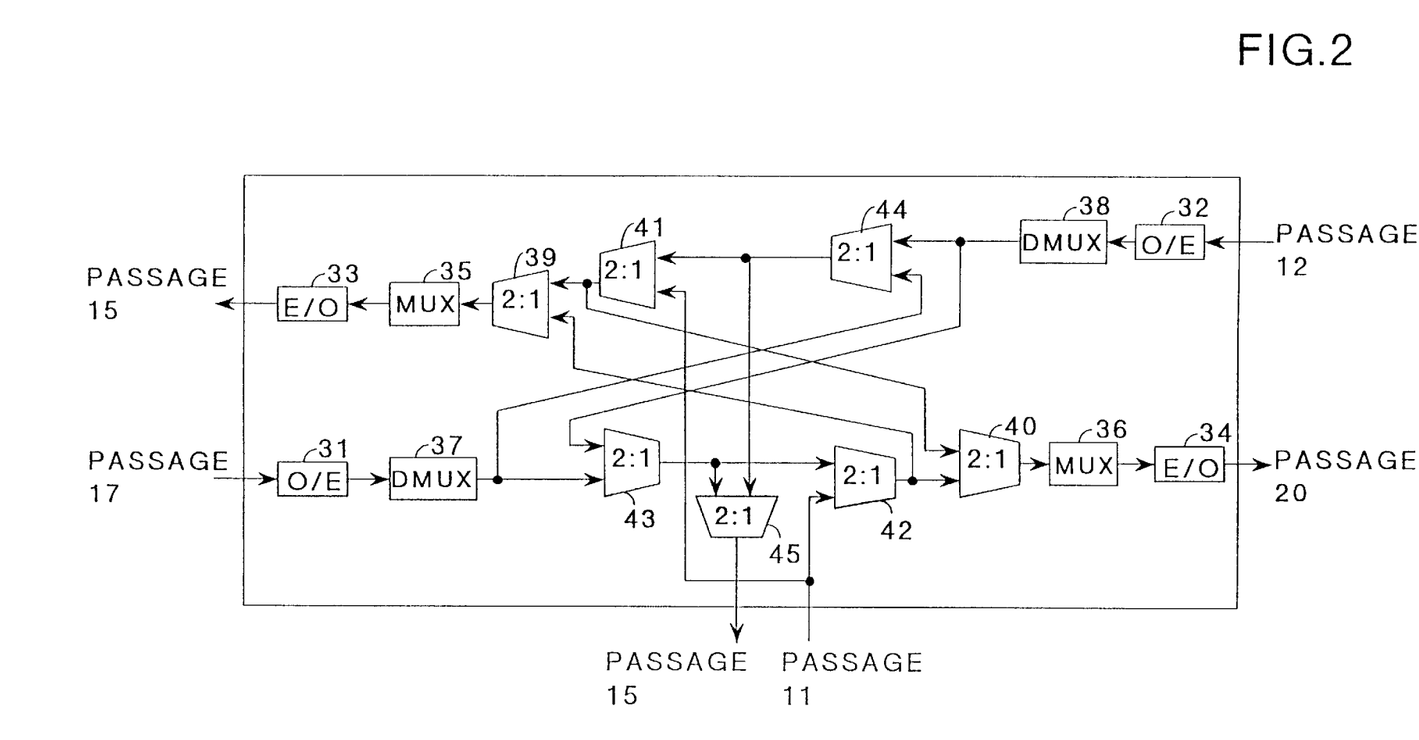
FIG. 2 is a structural view showing a node according to one embodiment of the present invention.

FIG. 2 is a view showing a schematic structure of the inside of the node in the ring system of the present invention. Here, the invention will be explained with respect to an example of the node A1. The other nodes A2, B1 and B2 have the same structure.

In FIG. 2, the O/E parts 31 and 32 are a circuit for converting an optical signal input from the passage 17 and 12 connected to this node A1 into an electric signal. The E/O parts 33 and 34 is a circuit for converting the electric signal which is processed in the node A1 into the optical signal.

The DMUX parts 37 and 38 is a circuit for separating data which is converted into the electric signal in the O/E part into data of a frame unit, while the MUX parts 35 and 36 are a circuit part for multiplexing data of the frame unit on the contrary. The selector parts 41 and 42 are major parts for realizing a connection switching operation which characterizes the present invention.

In other words, the service selector part 1 shown in FIG. 1 corresponds to the selector part 41 shown in FIG. 2. Incidentally, the service selector part (SS) which corresponds to the selector part 42 shown in FIG. 2 is omitted in FIG. 1.

To the selector part 41, data is input from the passage 11 shown in FIG. 1. Furthermore, the data from the passage 12 of FIG. 1 is input to the selector part 41 via the O/E part 32, the DMUX part 38 and the selector part 44.

The selector part 41 compares alarm information included in two data to be input and selects either of the two data to be transmitted to the selector part 39. Thereafter, the data output from the selector part 39 is output to the passage 15 of FIG. 1 via the E/O part 33.

Furthermore, the selector part 42 have a similar function as the selector part 41 which serves to select either of the passage 11 and the passage 17 to be output to the passage 20. It is judged by checking the line quality of the two passages as to which of the two data is to be selected. Specifically, the alarm information is used.

This alarm information is data which is used to check the quality of the passage through which the data flows. This alarm information will be described later.

The selector parts 39 and 40 of FIG. 2 have the selector function for selecting either of the two data to output the data. Primarily the selector parts 39 and 40 serve as means for changing over the connection at the time of the generation of the line in the ring A. When the trouble is not caused, the data given from the aforementioned selector part 41 is selected at the selector part 39 to be sent to the MUX part 35.

In the case where the data from the passage 11 connected to the ring B is selected at the selector part 41, data on the ring B passes through the selector part 41, the selector part 39, the MUX part 35 and the E/O part 33 to be sent out to the passage 15 on the ring A.

On the other hand, when the trouble is generated in the passage 12 and the passage 20, the data which passes through the passage 19 and the passage 12 from the ring B is not input to the service selector (SS) 1.

At this time, the fact that the trouble is generated in the passage 12 and the passage 20 can be detected with the O/E part 32 and the DMUX part 38 which constitute the input front step part. When the fact that the trouble is generated is detected, the selector 39 changes over the connection in the following manner.

In other words, the data given from the passage 11 is input to the selector part 39 via the selector part 42. Otherwise, the data input to this node A1 from the passage 17 is switched via the O/E part 31, the DMUX part 37, the selector part 43, and the selector part 42 to be input to the selector part 39.

Then, at the selector part 39, the data which flows via the selector part 42 is selected to be output to the passage 15 from the MUX part 35 and the E/O part 33. Furthermore, in the similar manner, when the trouble is generated in the passage 15 and 17, the selector part 40 selects the data which has input from the passage 12 and which has passed through the selector part 41 to carry out a function of switching the data back to the passage 20 via the MUX part 36 and the E/O part 34.

Furthermore, the selector part 43 and 44 serves as a means of changing over connection at the time of the generation of the line trouble in the similar manner as the selector parts 39 and 40. When the trouble is not generated in the passage 12, the data given from the passage 12 is sent to the selector part 41 via the E/O part 32, the DMUX part 38 and the selector part 44.

On the other hand, when the trouble is generated in the passage 12, the fact that the data input given from the passage 12 ends is detected with the DMUX part or the like, so that the selector part 44 changes over the connection to select data given from the DMUX part 37.

In other words, when the trouble is generated in the passage 12, the data given from the passage 17 is sent to the passage 15 via the O/E part 31, the DMUX part 37, the selector part 44, the selector part 41, the selector part 39, the MUX part 35, and the E/O part 33.

Furthermore, the selector part 43 usually connects lines in such a manner as to give data from the DMUX 37 to the selector part 42. However, at the time of the generation of the trouble in the passage 17, the line is connected in such a manner that the data given from the passage 12 is given to the selector part 42. Furthermore, the selector part 45 serves as a means of outputting either of the data given from the passage 12 and the data given from the passage 17 to the passage 13.

FIG. 1 shows a case in which the data given from the passage 17 is sent to the passage 13.

It depends on the result of checking the line quality as to which of the two data is to be selected at the selector 45.

The summary of the node operation which contributes to the mutual connection between rings has been described above.

Next, the data flow through the ring system in the case where the trouble is caused in the passages 12 and 20 of the ring A will be explained in comparison with the case in which no trouble is generated.

FIG. 1 shows the passage of the data flow in the case of communication between the node A4 of the ring A and the node B5 of the ring B when no trouble is caused.

Figure 3:
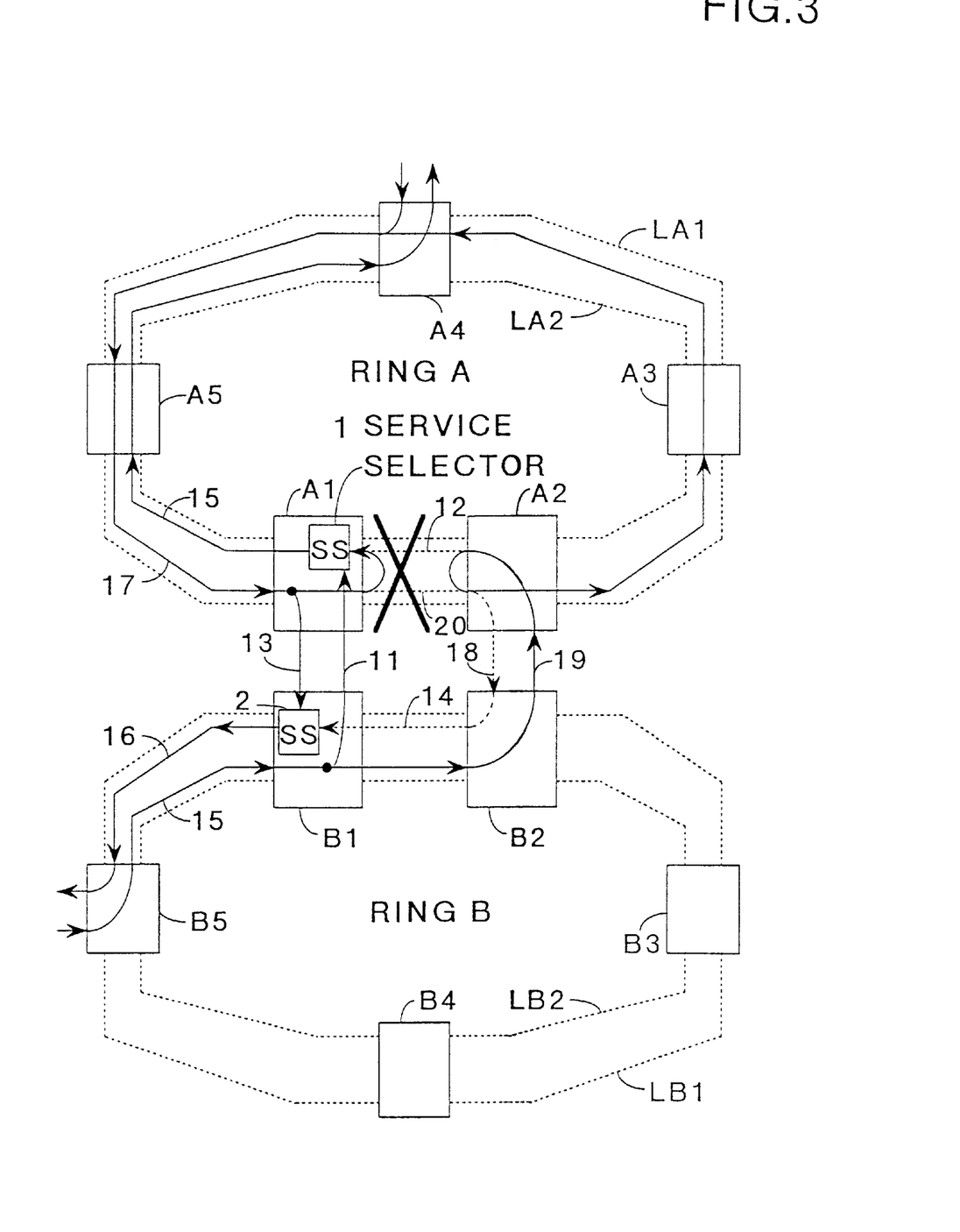
FIG. 3 is a view for explaining an example of a line connection at the time of the generation of troubles in ring system of the present invention.

FIG. 3 shows a view for explaining the saving passage in the case where the trouble is caused on the passage 12 and 20 in the ring system according to the present invention.

In FIG. 1, in the beginning, the data which is sent onto the ring line LA1 from the node A4 on the ring A is sent to the node A1 through the node A5. Then the data which has sent to the node A1 is sent to the node B1 on the ring B via two passages.

One passage is a passage which sends data directly from the node A1 to the node B1 via the passage 13. The other passage is a passage which passes from the node A1 to the node B1 via the node A2, the passage 18 and the node B2. The data which is sent through the two passages is input to the service selector 2 via the node B1. At the service selector 2, either of the data is selected in consideration of the circuit quality of the both passages and the selected data is sent to the passage 16 to be given to the node B5.

On the contrary, in the case where the data is transmitted to the node A4, the data is transmitted via the passage through which data is transmitted directly from the node B1 to the node A1 via the passage 11 and the passage through which the data is transmitted from the node Bi to the node A1 via the node B2, the passage 19 and the node A2. Then, at the node A1, either of the two data which is transmitted through the two passages is selected to be sent out to the line LA2 to be given to the node A4 via the node A5.

In this manner, since the ring A and the ring B are connected with two passages, the passage connecting the node A1 and the node B1 (passages 11 and 13), and the passage connecting the node A2 and the node B2 (passages 18 and 19), the connection between rings can be saved even when the trouble is generated in either of the two passages.

Furthermore, in the case where the trouble is caused in the passage on the ring as shown in FIG. 3, the passage where the trouble is generated is evaded, data is sent in return on the other ring line to secure the saving passage.

For example, when the data which is transmitted from the node B5 on the ring B to the circuit LB2 is input to the node B1, one data is sent out to the node A1 via the passage 11. The other data is sent to the node B2 to be sent to the node A2 via the passage 19.

In FIG. 3, in the case where the trouble is generated in the passages 12 and 20, the node A1 and the node A2 can detect that the data which has passed through the passages 12 and 20 is not received, an operation is carrying out to turn up the data. In other words, at the node A1, an operation is carried out to turn up the data from the ring line LA1 to the LA2 at the node A1. At the node A2, an operation is carried out to turn up the data from the ring line LA2 to the LA1.

Consequently, the data which is sent out to the node A2 is turned up to the ring circuit LA1 to be input to the node A1 via the nodes A3, A4 and A5. Then the data is turned up to the ring line LA2 to be input to the service selector 1.

At the service selector 1 of the node A1, the data which is turned up to the ring circuit LA2 and the data which is transmitted via the aforementioned passage 11 is compared with each other to send out either of the data to the passage 15. Then, the data which is sent out to the passage 15 is sent out to the node A4 via the node A5.

In this manner, even when the trouble is generated in the line on the ring, as the preliminary ring line is used by turning up the data, the two passages in the connection between rings can be secured and the use efficiency of the ring line can be made better.

Next, an inside structure and the processing of the service selector which carries out an important role of realizing the function of the connection between rings of the present invention will be explained.

Figure 4:
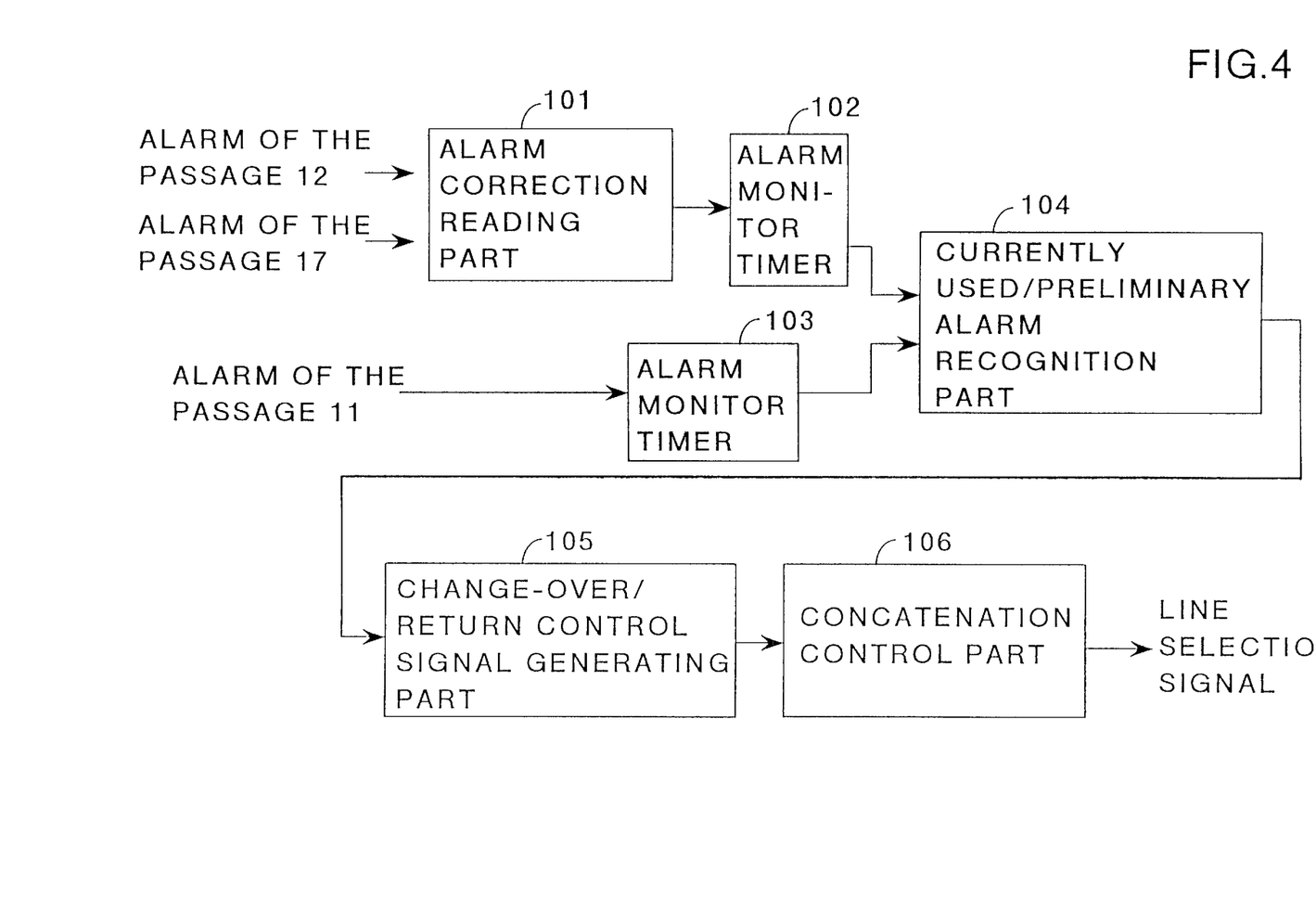
FIG. 4 is a structural block view showing a service selector according to one embodiment of the present invention.

FIG. 4 is a structural block view showing a service selector (SS) according to one embodiment of the present invention.

The service selector (SS) shown in FIG. 4 is a service selector 1 provided in the node A1 on the ring A of FIG. 1. The passage 11 which contributes to the connection with the passage 12, the passage 17 and the ring B is connected to the service selector 1.

The service selector 1 comprises six function blocks (101 through 106), but the so-called micro-computer function block such as a CPU, a ROM, a RAM, a timer or the like which are not shown are also provided. Each of the function block of the service selector 1 is controlled with the CPU on the basis of the program incorporated in the ROM or the RAM.

The data which is transmitted between respective nodes through the ring line comprises SDH frame format which follows the CCITT.

At a predetermined position of the SDH frame format, the following alarm information is memorized. For example, LOP (Loss of Pointer), PAIS (Path Alarm Indication Signal), SLM (Signal Level Mismatch), B3-MAJ (B3-Parity Major Alarm), B3-MIN (B3-Parity Minor Alarm) or the like are provided. A priority right is given to the alarm information. Generally, LOP has the highest priority whereas the B3-MIN has the lowest priority.

By monitoring the alarm information, the quality of the line to which the frame data is sent can be judged.

The data which is input from the passage 12, the passage 17 and the passage 11 is checked as to the alarm information at a predetermined position in the frame format of the data. For example, the passage in which the LOP alarm is detected is judged that the line quality is poorer than the passage in which the SLM alarm is detected.

Besides, when no alarm information is generated at all, it is judged that the quality of the passage is good, and the data which has passed through the passage is selected. In the case where the alarm information is generated, it is judged that the quality of the passage is poor. However, in the case where the alarm information is not generated in one passage of the two passages at the service selector and the alarm information is generated in the other passage, the data sent from the aforementioned passage is selected.

Furthermore, in the case where the alarm information is generated in both two passages, the priority of the alarm information is judged, and the data which has passed through the passage having a low priority of the alarm information is selected.

In FIG. 4, it is thought that the information on the presence of the alarm information is given to the service selector from the CPU with respect to each of the passages 12, 17 and 11 for simplicity of the explanation. At the following explanation, the information indicated "alarm presence" is "1", and the information indicated "no alarm" is "0".

In the case where the trouble is caused as shown in FIG. 3, the data of the passage 19 is sent back to the node A2, and is saved in the node A1 with the passage 17. As a consequence, the alarm correction reading part 101 shown in FIG. 4 selects either of the alarm from the passage 12 or the alarm from the passage 17 by using the trouble generation notice from the CPU so that the alarm monitor timer part 102 which monitors the alarm of the passage 12 can monitor the alarm from the passage 17.

Figure 5:
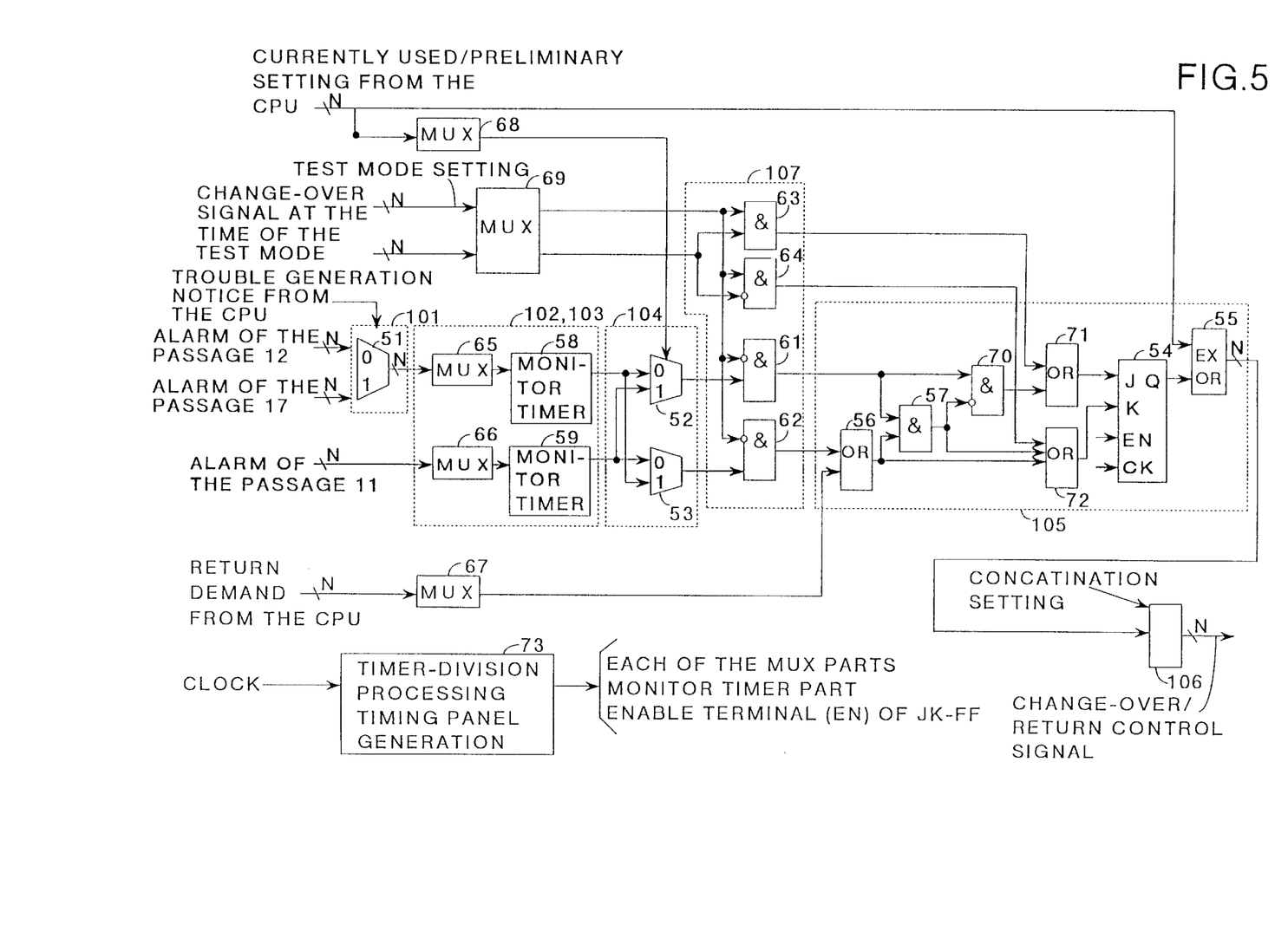
FIG. 5 is a circuit structural view showing the service selector according to one embodiment of the present invention.

For example, in the case where no trouble is caused within the ring, "0" (no trouble) is output to the trouble generation notice from the CPU shown in FIG. 5, and the alarm of the passage 12 is output to the output of the alarm rereading part 101.

When the trouble is generated as shown in FIG. 3, "1" (the presence of the trouble) is output to the trouble generation notice from the CPU whereas the alarm of the passage 17 is output to the output of the alarm correction reading part 101. Either alarm of the passage 12 or the alarm of the passage 17 which is selected by using the trouble generation notice from the CPU is sent to the alarm monitor timer part 102.

The alarm correction reading part 101 can be realized with one selector as the most simple structure.

The alarm monitor timer parts 102 and 103 serves to monitor the continuation time of the generated alarm. In other words, the input alarm is only monitored for the set time given from the CPU. In the case where the alarm is generated for more than the predetermined time, a trigger signal is generated to carry out switching or return of the ring line.

For example, in the case where the alarm monitor timer part 103 detects the alarm from the passage 11 for more than the predetermined time, trigger signal "1" for switching the line is output when the alarm does not detect, trigger signal "0" is output.

The alarm monitor timer part 102 monitors the alarm selected in the alarm correction reading part 101, and a similar trigger signal is output.

This alarm monitor timer parts 102 and 103 may be constituted by using a so-called timer element. However, the timer monitor parts 102 and 103 can be easily constituted by using the RAM as described later.

The currently used/preliminary alarm recognition part 104 judges whether the trigger signal input from the aforementioned alarm monitor timer parts 102 and 103 is for the currently used line or for the preliminary line.

Although not shown in FIG. 4, either the currently used setting information or the preliminary setting information of the present ring line from the CPU is given to the currently used/preliminary alarm recognition part 104.

For example, the currently used/preliminary setting information is "0", it is assumed that the passage 11 is used as the currently used passage whereas the passage 12 is used as the preliminary passage. At this time, out of the two passages through which the data is transmitted from ring B to ring A, the passage which is directly connected to the node A1 from the node B1 is used as the currently used passage. In the case where no trouble is caused, the data which has passed through the currently used passage 11 is selected with the service selector 1.

On the contrary, in the case where the currently used/preliminary setting information is "1", the passage 11 is used as the preliminary circuit whereas the passage 12 is used as the currently used circuit. As will be described later, this currently used/preliminary recognition part 104 can be comprised by two selectors.

The change-over/return control signal generating part 105 uses a trigger signal obtained from the currently used/preliminary alarm recognition part 104 to generate a control signal for the change-over and return of the line. For example, for the return to the currently used line, "0" is output as a control signal, and for the change-over to the preliminary circuit, "1" is output as a control signal. Here, though not shown, the currently used/preliminary setting information is given from the CPU.

This change-over/return control signal generating part 105 can be comprised by a JK flip-flops and several logic elements.

In the selection of the line, the control signal output from the change-over/return control signal generating part 105 is used to carry out the change-over or the return of the passage in the node A1. For example, in the case where the return signal ("0") is output, the currently used passage 11 and the passage 15 on the ring are connected.

Furthermore, in the case where the change-over signal ("1") is output as the control signal, the preliminary passage 12 and the passage on the ring 15 are connected.

In the case where the data frame which is transmitted between rings are not chained and serves as one channel, the concatenation control part 106 in FIG. 4 may not be provided. The service selector (SS) 1 may comprises five function blocks (101 through 105).

However, the data in the SDH form is transmitted in a chain to several channels, and the concatenation control part 106 shown as follows is required.

Generally, when the chain channel is transmitted from a different passage in the change-over/return operation of the line, the continuation of the channel is damaged so that a normal data transmission cannot be carried out. Consequently, the plurality of chain channels are required to be transmitted all through the same passage, and the concatenation control is carried out for fitting the transmission channel of the channel which follows to the passage to which the first channel is transmitted.

The concatenation control part 106 carries out an operation of fitting the control signal output from the change-over/return control signal generation part 105 to the front channel by the channel which is desired to be chained. This concatenation control part 106 can be realized with a plurality of selectors which are provided for each of the groups which are chained.

The aforementioned is the function block of the service selector SS of this invention.

FIG. 5 is a circuit structural view showing the service selector (SS) according to one embodiment of the present invention.

An explanation is made on the basis of the service selector SS provided on the node A1, but the service selector SS provided on other nodes (A2, B1 and B2) has a similar structure and function. In FIG. 5, the alarm correction reading part 101 is realized with one selector 51.

As described above, the alarm information of the passage 12 and the passage 17 is input to the selector 51, and either of the alarm information is selected with the trouble generation notice signal which is transmitted from the CPU. The alarm information is given from the other alarm detection part inside of the node (not shown), but the alarm information can be separately given for each channel as a binary signal indicative of "0" or "1".

For example, considering that the n channel data are transmitted and received, the alarm information corresponding to each of the channels of the data which flows on the passage 12 is input to the selector 51 through n signal lines. In the similar manner, the alarm information of the passage 17 is input to the selector 51 through n signal lines.

The trouble generation notice signal which is sent from the CPU is a binary signal. For example, when "0" is given, it is designated that the trouble is not generated on the ring A. When "1" is given, it is designated that the trouble is generated on the ring A. When no trouble is generated on the ring A (in other words, the trouble generation notice signal= "0"), the selector 51 is allowed to function to select the currently used passage 12 of the ring A as usual.

When the trouble is generated on the ring A (in other words, the trouble generation notice signal="1"), the selector 51 is allowed to function so as to select the preliminary passage 17 of the ring A in order to carry out the return connection of the line. The alarm information which is selected is output to the alarm monitor timer part 102 as it is from the selector 51 through n signal lines.

Incidentally, this alarm correction reading part 101 is used for the detection of the line trouble on one ring line and the switching of the line. The alarm correction reading part 101 does not directly contribute to the switching or the return of the line with respect to the mutual connection between rings.

In FIG. 5, the alarm monitor timer part 102 can comprise monitor timers 58 and 59, and MUX 65 and 66 which perform time-division multiplexing. The MUX 65 and 66 is serve to subject the n alarm information output from the selector 51 to time-division multiplexing to output the information onto one signal line. In other words, n channel alarm information is serialized on one signal line and is output.

Figure 6:
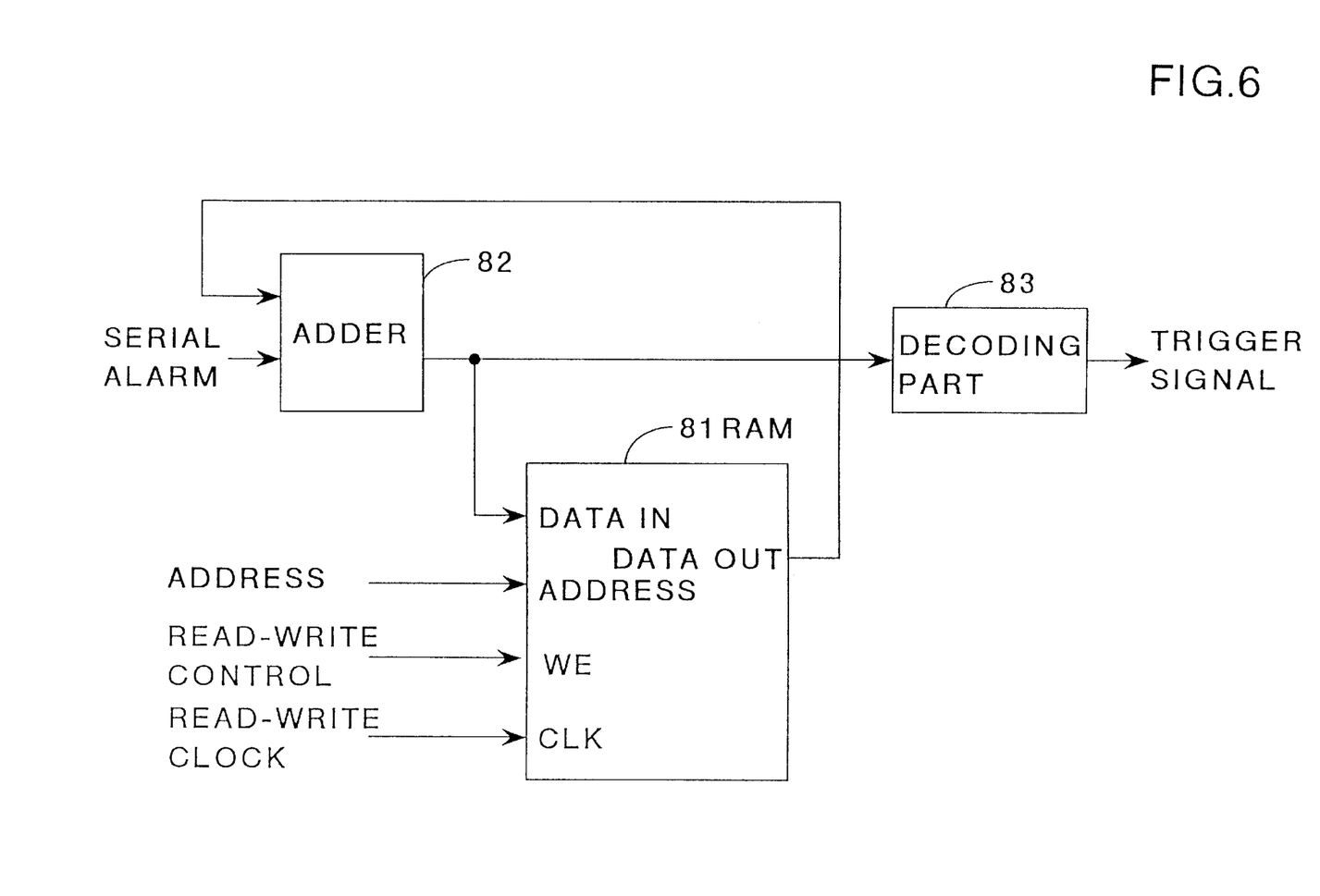
FIG. 6 is a circuit structural view showing a monitor timer according to one embodiment of the present invention.

The monitor timers 58 and 59 monitor the presence of the generation of the alarm information for a definite time. For example, the monitor timers 58 and 59 may be constituted by using the RAM 81, the adder 82, and the decoding circuit 83. The address and read-write control signal and the read-write clock are given from the time-division processing timing pulse generation part 73 shown in FIG. 5.

This time-division processing timing pulse generation part 73 serves to generate a clock pulse given to each MUX and the JK flip-flop of the change-over/return control signal generating part 105.

The serial alarm shown in FIG. 6 is output of the MUX 65 and 66 shown in FIG. 5. The serial alarm is either value "0" or "1". An area memorizing data for each channel is allocated to the RAM 81 so that the alarm count value for each channel is written down.

Figure 7:
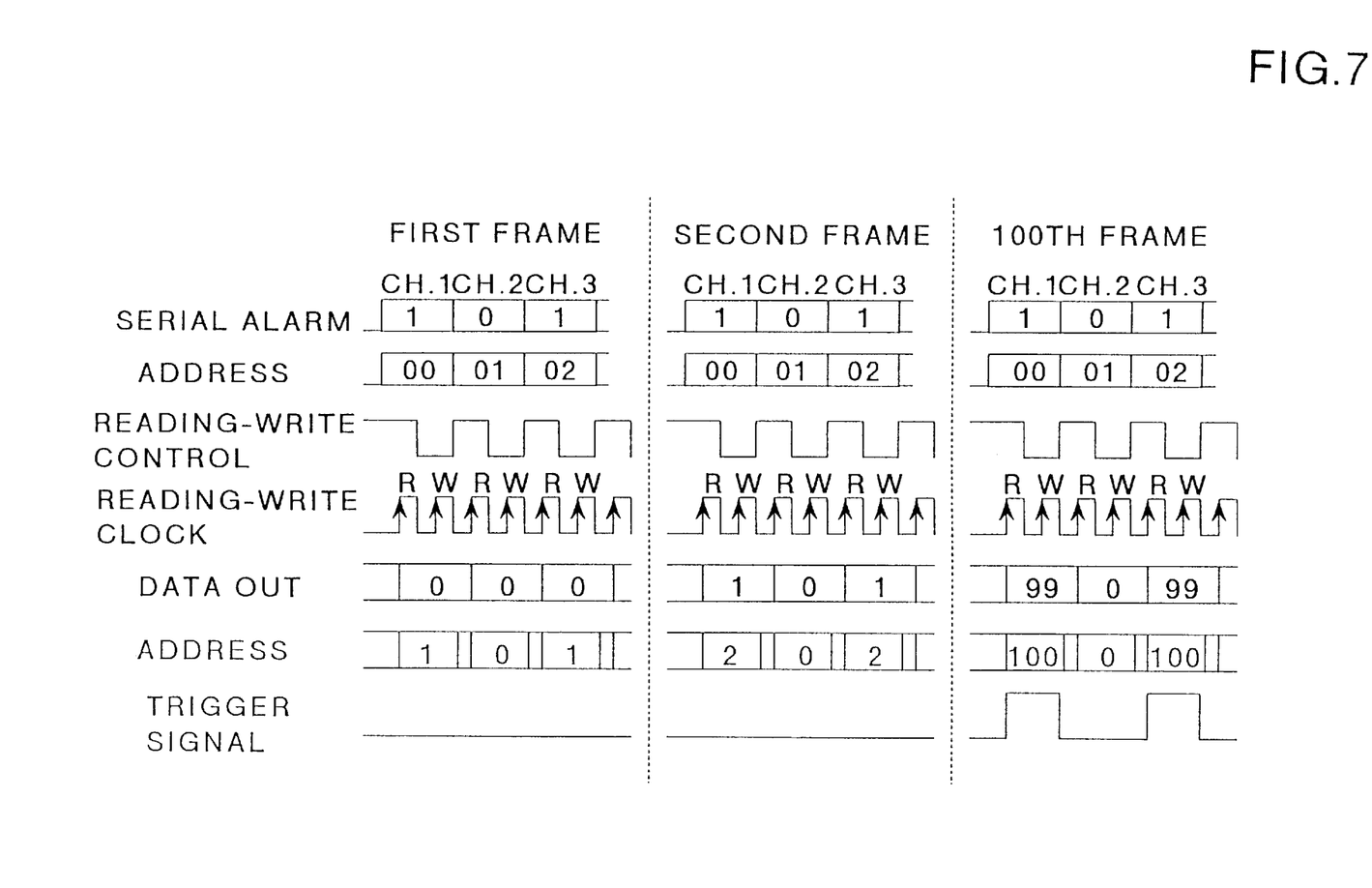
FIG. 7 is a time chart for explaining an operation in FIG. 6.

FIG. 7 shows a time chart for explaining an operation of the monitor timers 58 and 59.

Now, one frame comprises three channels, and the serial alarm as shown in FIG. 7 is input to the adder 82. Here it is shown that as the serial alarm of the channel 1 and the channel 3 is "1", an alarm generates on the channel 1 and 3. As the serial alarm of the channel 2 is "0", an alarm does not generate on the channel 2.

In the beginning, when the serial alarm of the channel 1 is input to the adder 82, a counter value which is memorized in the area for the channel 1 of the RAM 81 at the same timing is read, and the counter value is input to the adder 82.

At the adder 82, a serial alarm of the channel 1 and a counter value of the channel 1 are added so that the result of the addition is written into the memory area for the channel 1 of the RAM 81.

In the case of first frame shown in FIG. 7, since the serial alarm of the channel 1 is "1" and "Data out" is "0", "1" is written into the area of channel 1 of the RAM.

A similar processing is carried out with respect to the channel 2 and the channel 3. In the first frame, "0" is written to the area of the channel 2 of the RAM 81 and "1" is written to the area of the channel 3 of the RAM 81.

Furthermore, the reading and writing processing with respect to such RAM 81 is repeated. As shown in FIG. 7, when the same alarm generation continues up to the 100th frame, a counter value 100 is written to the area of the channel 1 and 3 of the RAM 81.

On the other hand, the output of the adder 82 is input to a decoding circuit 83. Then the decoding circuit 83 checks whether or not the counter value corresponding to time which is preliminarily set is input. Then, when the counter value corresponding to set time is input, the decoding circuit 83 outputs a trigger signal "1".

For example, when the counter value which is decoded is 100, a trigger signal "1" is output for the change-over and return of the line from the decoding circuit 83 in the case where 100 frame alarm is counted.

What is described above is an embodiment of the alarm monitor timer part 102 using the RAM. However, the present invention is not limited thereto. The alarm monitor timer part 102 can be realized by using the logic element such as the counter and the flip-flop and the like. However, a structure using the RAM shown in FIG. 6 is excellent in terms of making the circuit size small.

In FIG. 5, the currently used/preliminary alarm recognition part 104 can be realized with two selectors 52 and 53. Here, in the selectors 52 and 53, a trigger signal output from the monitor timer 58 and 59 serves as an input signal.

Furthermore, when currently used/preliminary setting data is given from the CPU to judge whether the trigger signal input on the basis of the currently used/preliminary setting data is for the currently used line or for the preliminary line.

For example, when the currently used/preliminary setting data is "0", the currently used line is the passage 11 whereas the preliminary line is the passage 12. It is assumed that when the currently used/preliminary setting data is "1", the currently used line is the passage 12 whereas the preliminary circuit is the passage 11.

At this time, when it is judged that the trigger signal to be input is for the currently used line, a trigger signal "1" is output from the selector 52. When it is judged that the trigger signal is for the preliminary line, a trigger signal "1" is output from the selector 53.

In FIG. 5, the test control part 107 is not associated with the actual state of the line alarm state, and serves to carry out the change-over and the return of the line forcibly by a control from the CPU. The test control part 107 is required at the time of so-called line test. Consequently, the test control part 107 is not particularly required when the change-over and the return of the circuit is performed with the change of the state of the actual alarm. The operation thereof will be described later.

In FIG. 5, the change-over/return control signal generating part 105 can comprise an AND circuit, an OR circuit, the exclusive OR circuit and the flip-flop. When the test control part 107 is absent, the output of selector 52 and 53 is directly given to the change-over/return control signal generating part 105.

Here, the case where the output of the JK flip-flop 54 is "1" means the change-over to the preliminary line whereas the case of "0" means the return to the currently used line.

The exclusive OR circuit 55 takes an exclusive OR of the currently used/preliminary setting data from the CPU and the JK flip and output the control signal for the change-over or the return. When the control signal is "0", the signal means the selection of the passage 11. When the control signal is "1", the signal means the selection of the passage 12.

The OR circuit 56 takes an OR logic of the return demand signal from the CPU and the trigger signal from selector 53 and carry out a function of returning the passage back to the currently used line when the return demand signal is "1".

The AND circuit 57 serves to return the passage back to the currently used line when a trigger signal is generated from both of the selectors 52 and 53.

Now, suppose that the currently used/preliminary setting from the CPU is "0". In other words, suppose that the passage 11 is the currently used line whereas the passage 12 is the preliminary line. At this time, supposing that the alarm is generated on the side of the currently used passage 11, a trigger signal "1" is generated for the change-over of the line with the monitor timer 59. This trigger signal is output from the selector 52, because the currently used/preliminary setting data from the CPU is set to "0" at the currently used/preliminary alarm recognition part 104.

Furthermore, the trigger signal "1" output from the selector 52 is input to the J terminal of the JK flip-flop 54 via the AND circuit 70 and the OR circuit 71. At this time, the output Q of the JK flip-flop 54 becomes "1" to be given to the exclusive OR circuit 55.

On the other hand, since the currently used/preliminary setting data the CPU which is input to the exclusive OR is "0", an exclusive OR of the setting data and the output Q (="1") is taken and a control signal "1" which means a change-over demand of selecting the passage 12 is output from the exclusive OR circuit 55. When concatination control is not required, the control signal "1" is used as the change-over/return control signal, and then the connection to the passage 15 is switched from the passage 11 to the passage 12.

Next, the return operation of the circuit will be explained.

In the beginning, an alarm is generated and the aforementioned change-over operation is carried out to assume a state of the change-over to the passage 12. Supposing that the alarm in the passage 11 is restored when this state is assumed, a trigger signal ceases to exist which notifies the generation of the alarm at the monitor timer 59. In other words, a trigger signal "0" is generated from the timer 59, and a trigger signal "1" is generated from the monitor timer 58 so that this trigger signal becomes a signal indicative of the return demand.

When this trigger signal "1" is input to the currently used/preliminary alarm recognition part 104 from this monitor timer 58, the trigger signal "1" is output from the selector 53 because the currently used/preliminary setting data is "0".

When the trigger signal "1" is given to the K terminal of the JK flip-flop via the OR circuits 56 and 72 and the output Q of the JK flip-flop becomes "0". This output Q (="0") means a return demand.

At the exclusive OR circuit 55, the exclusive OR of the output Q ("0") and the currently used/preliminary setting data ("0") from the CPU are taken with the result that the control signal "0" is output from the change-over/return control signal generating part 105 in the end.

When the concatenation control part 106 is not provided, this control signal "0" is used as the change-over/return control signal to bring the connection to the passage 15 from the passage 12 to the passage 11.

Incidentally, the output of the change-over/return control signal generating part 105 is separated into parallel signals of n channel with the timing pulse given from the time-division processing timing pulse generating part 73 to the enable terminal (EN) of the JK flip-flop.

As described above, on the basis of the alarm information of the passages 11, 12 and 17 connected to the service selector (SS) 1, the change-over/return control signal is generated.

Figure 8:
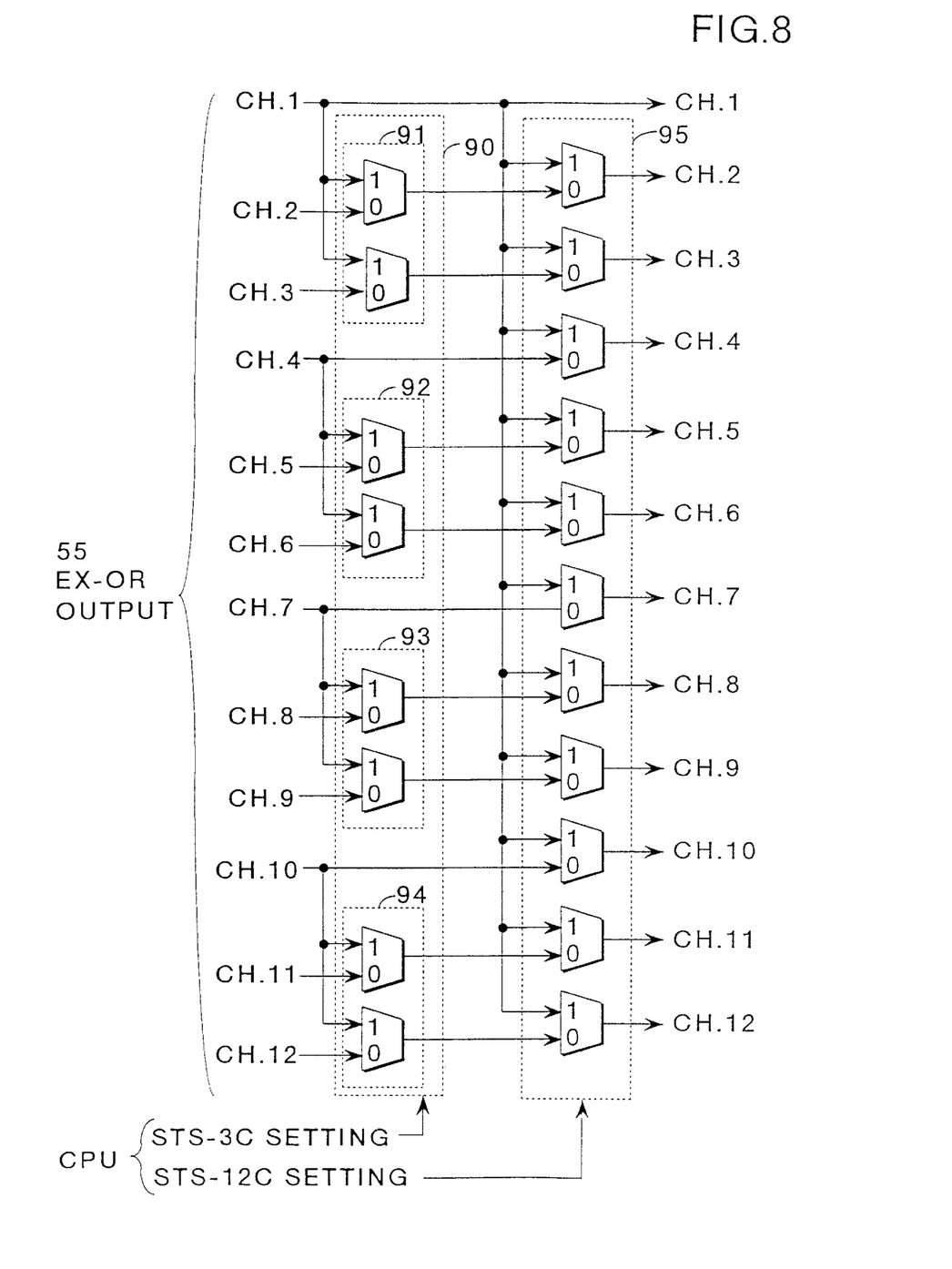
FIG. 8 is a circuit structural view showing a concatenation control part according to one embodiment of the present invention.

Next, an embodiment of an operation and a structure of the concatenation control part 106 will be explained.

FIG. 8 is a view showing a structure of one embodiment of the concatenation control part 106. Here, a concrete example of circuit of the "STS-3C setting" for chaining the three-channel portions of the control signal and the "STS-12C setting" for chaining the 12 channel portions of the control signal is shown.

In FIG. 8, from the left side, the "change-over/return control signal" which is output from the exclusive OR circuit and correspond to channels 1 through 12 respectively is input. Besides, reference numeral 90 of FIG. 8 denotes the STS-3C setting selector group and 95 denotes the STS-12C selector group.

The selector group 91 serves for chaining the change-over/return control signal of three channels 1, 2 and 3 to the change-over/return control signal of all the front channel 1.

In the similar manner, the selector group 92 serves for chaining the channels 4, 5 and 6, the selector group 93 serves for chaining the channels 7, 8 and 9, and the selector group 94 serves for chaining the channels 10, 11 and 12.

At the selector group 95, all the control signals from the channel 2 to the channel 12 is chained to the control signal of the front channel 1. From the right side of FIG. 8, the chained "change-over/return control signal" is output.

Specifically, at the time of STS-3C setting, the channels 2 and 3 are chained so that the alarm state of the channels 2 and 3 becomes the same as the alarm state of the channel 1. When the front channel 1 is in the line change-over demand state, the channels 2 and 3 are set in the line change-over demand state with the result that the data is selected which has passed through the same passage as the channel 1.

In addition, the channels 5 and 6 are chained to the alarm state of the front channel 4, and the channels 8 and 9 are chained to the alarm state of the front channel 7, and the channels 11 and 12 are chained to the alarm state of the front channel 10.

At the time of STS-12C setting, the channels 2 through 12 are chained so that the alarm state of the channels 2–12 become the same as the alarm state of the front channel 1. When the front channel 1 is in the line return state, the channels 2 through 12 become the same line return state irrespective of the alarm state of the actual channels 2 through 12 with the result that the data is selected which has passed through the same passage as the channel 1.

Next, an operation and a structure of the test control part 107 in FIG. 5 will be explained. The test control part 107 comprises several AND circuits 61, 62, 63 and 64 as shown in FIG. 5.

To the test control part 107, a test mode setting signal and a change-over signal at the time of the test mode are given from the CPU. The test mode setting signal is a signal for forcibly coverting the mode to the test mode irrespective of the actual change-over operation. Here, at "1", the test mode is given.

The change-over signal at the time of the test mode is a signal for specifying the change-over of the line or the return thereof when the mode is converted to the test mode. Here, at "1", the change-over of the circuit is denoted, and at "0", the return of the circuit is denoted.

At the time of the conversion to the test mode, the following operation will be performed at this test control part 107. When the test mode setting signal becomes "1", a trigger signal given from the currrently used/preliminary alarm recognition part 104 is masked so as not to be input to the change-over/return control signal generating part 105 at the AND circuits 61 and 62. At the AND circuits 63 and 64, the change-over signal at the time of the test mode given from the CPU is controlled so as to be input to the JK flip-flop via the OR circuits 71 and 72.

For example, when the change-over signal at the time of the test mode is "1", "1" is input to the J terminal of the JK flip-flop via the OR circuit 71 to be operated to perform the change-over control (change-over from the passage 11 to the passage 12).

When the change-over signal at the time of the test mode is "0", "1" is input to the K terminal of the JK flip-flop via the OR circuit 72 to be operated to perform the return control (return from the passage 12 to the passage 11).

This test control part 107 is used in the case of inspecting the mutual connection between rings at the time of the introduction of the ring system and at the time of the maintenance of the ring system.

So far, the present invention has been explained by way of an embodiment in which the ring system of the present invention is applied to SDH. However, the ring system of the present invention may also be applied to SONET (Synchronous Optical Network) which is a United States standard.

According to the present invention, a ring system having a high line usage efficiency can be realized.

In addition, since a monitor timer part is provided, a frequent and unnecessary generation of the change-over/return of the line can be prevented when the alarm is generated too often.

Since the alarm correction reading part is provided, not only the trouble in the mutual connection between rings can be prevented but also an efficient saving passage can be secured in the case of the line trouble in the ring. Furthermore, since a test control part is provided, the inspection of the ring system can be easily performed at the time of the maintenance.

What is claimed is:

1. A connection switching circuit to be used for a ring system in which a first ring including a first node and a second node, and a second ring including a third node and a fourth node are provided with two communication lines which allow data to flow in a different direction respectively, and the system is connected with a currently used passage connecting the first node and the third node and a preliminary passage connecting the second node and the fourth node, the circuit being disposed in said each node and comprising:

an alarm correction reading part for generating a control signal for making a detour at a communication line within the same ring by using an alarm of the data which flows in the two communication lines when troubles of lines within the same ring generate;

an alarm monitor part for outputting respective alarm detection signals by detecting an alarm which is generated in the currently used passage and the preliminary passage;

a currently used and preliminary alarm recognition part for identifying whether the detected alarm is generated on the currently used passage and for outputting an identify signal by using the alarm detection signal;

a switching control signal generation part for generating a control signal for selecting a passage to be used in the data transmission between the rings by using the identify signal, either the currently used passage or the preliminary passage being selected by monitoring the alarm of the data which flows on the currently used passage or the preliminary passage to connect the first ring and the second ring with each other.

2. The connection switching circuit according to claim 1, further comprising a concatenation control part for converting a control signal which is associated with other data which continues the front data by a control signal which is generated in the aforementioned switching control signal generation part and which is associated with the front data so that a plurality of data to be concatenated which flows between the first and second rings is data which is transmitted from either of the currently used passage or the preliminary passage.

3. The connection switching circuit according to claim 1, further comprising a test control part forcibly forming a generation state of an alarm irrespective of the presence of the generation of an actual alarm of the currently used passage and the preliminary passage and giving a suspected identification signal to the switching control signal generation part.

4. The connection switching circuit according to claim 1, wherein the switching control signal generation part is provided with a returning part for returning to the currently used passage on the basis of a forcible return control signal which is given from the outside.

5. The connection switching circuit according to claim 1, wherein the alarm monitor part is provided with a rewritable memory circuit which memorizes information indicative of a continuation time of the alarm.

6. A ring system having the connection switching circuit of claim 1 which is provided on each node on plurality of rings constituting an SDH interface network, wherein respective rings are mutually connected with the connection switching circuit.

7. A ring system according to claim 6, wherein the ring system is a BLSR type.

* * * * *